(12) United States Patent  
Ryg

(10) Patent No.: US 12,346,761 B2  
(45) Date of Patent: Jul. 1, 2025

(54) SECURITY SCHEME FOR IDENTIFICATION TAGS

(71) Applicant: United Parcel Service of America, Inc., Atlanta, GA (US)

(72) Inventor: James Ryg, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 205 days.

(21) Appl. No.: 18/075,287

(22) Filed: Dec. 5, 2022

(65) Prior Publication Data

US 2024/0185019 A1 Jun. 6, 2024

(51) Int. Cl.
| | |
|---|---|
| H04W 12/06 | (2021.01) |
| G06F 7/00 | (2006.01) |
| G06K 7/10 | (2006.01) |
| G06K 19/07 | (2006.01) |
| G06K 19/077 | (2006.01) |
| G06Q 10/0833 | (2023.01) |

(52) U.S. Cl.
CPC ... *G06K 19/07758* (2013.01); *G06K 19/0723* (2013.01); *G06Q 10/0833* (2013.01)

(58) Field of Classification Search
None
See application file for complete search history.

(56) References Cited

U.S. PATENT DOCUMENTS

| | | | |
|---|---|---|---|
| 7,518,511 B1* | 4/2009 | Panja | G06Q 10/087 |
| | | | 340/568.1 |
| 2005/0102304 A1* | 5/2005 | Yukitomo | H03M 7/30 |
| 2016/0140486 A1* | 5/2016 | Tibbs | G06Q 10/083 |
| | | | 705/330 |
| 2017/0228665 A1* | 8/2017 | Levin | G06K 5/00 |
| 2018/0054735 A1* | 2/2018 | Hart | H04W 4/80 |
| 2018/0352050 A1* | 12/2018 | Li | H04L 67/5682 |
| 2020/0106762 A1* | 4/2020 | VanBlon | H04L 63/0846 |
| 2020/0320526 A1* | 10/2020 | Yoo | H04L 9/3234 |
| 2022/0108092 A1* | 4/2022 | Wan | G06K 7/10079 |

OTHER PUBLICATIONS

Dusart, P., & Traore, S. (2013). Lightweight authentication protocol for low-cost RFID tags. In Information Security Theory and Practice. Security of Mobile and Cyber-Physical Systems: 7th IFIP WG 11.2 International Workshop, WISTP 2013, Heraklion, Greece, May 28-30, 2013. Proceedings 7 (pp. 129-144). Springer Berlin Heidelberg.
Tremeau, A., Xu, S., & Muselet, D. (2020). Deep Learning for Material recognition: most recent advances and open challenges. arXiv preprint arXiv:2012.07495.(20 pages).

* cited by examiner

*Primary Examiner* — John F Mortell
(74) *Attorney, Agent, or Firm* — SHOOK, HARDY & BACON L.L.P.; Elena K. McFarland

(57) ABSTRACT

Various embodiments are related to anonymizing an identification code using internal data. Once anonymized, the identification code may be written to a tag, such as an RFID tag. Anonymizing the identification code using internal data may protect potentially sensitive tag data from outsiders while operating while operating within tag memory constraints.

20 Claims, 7 Drawing Sheets

SECURITY SCHEME FOR IDENTIFICATION TAGS

BACKGROUND

Identification tags, such as radio frequency identification (RFID) tags, are used to identify and track assets. For example, RFID tags can be used to track packages in a shipping facility or during loading or unloading from a vehicle. However, because identification tags primarily communicate over shared (i.e., unsecure) media such as radio, using identification tags to store asset information presents security risks. For example, a nefarious actor equipped with a high-powered tag reader may be able to identify valuable assets located inside a delivery truck. What is needed, among other things, is a way to obfuscate data stored on identification tags to improve security of the data, improve computer resource consumption (e.g., computer input/output), and the like, keeping in mind identification tags' limited memory capacity.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to a computer-implemented method that comprises the following operations. A first identification code associated with an asset is accessed. Internal data associated with the asset is accessed. The first identification code is transformed into a second identification code by performing an anonymization operation based on the internal data associated with the asset. The second identification code is written to a memory bank of the tag.

Some embodiments are directed a system that includes a radio frequency identification (RFID) tag and an RFID reader. The RFID tag may comprise an encoded identification code stored in electronic product code (EPC) memory. The encoded identification code may be associated with an asset. The RFID reader may be configured to read the encoded identification code from the EPC memory and transform the encoded identification code into a decoded identification code by performing a de-anonymization operation on the encoded identification code. The de-anonymization operation may be based on internal data.

Some embodiments are directed to one or more computer storage media having computer-executable instructions embodied thereon that, when executed by at least one processor, cause the at least one processor to perform operations. In some aspects, the operations include reading a first identification code from a tag affixed to an asset. The operations may also include transforming the first identification code into a second identification code by performing a cryptographic operation on the first identification code, wherein the cryptographic operation is based on internal data.

BRIEF DESCRIPTION OF THE DRAWINGS

Figure 1:
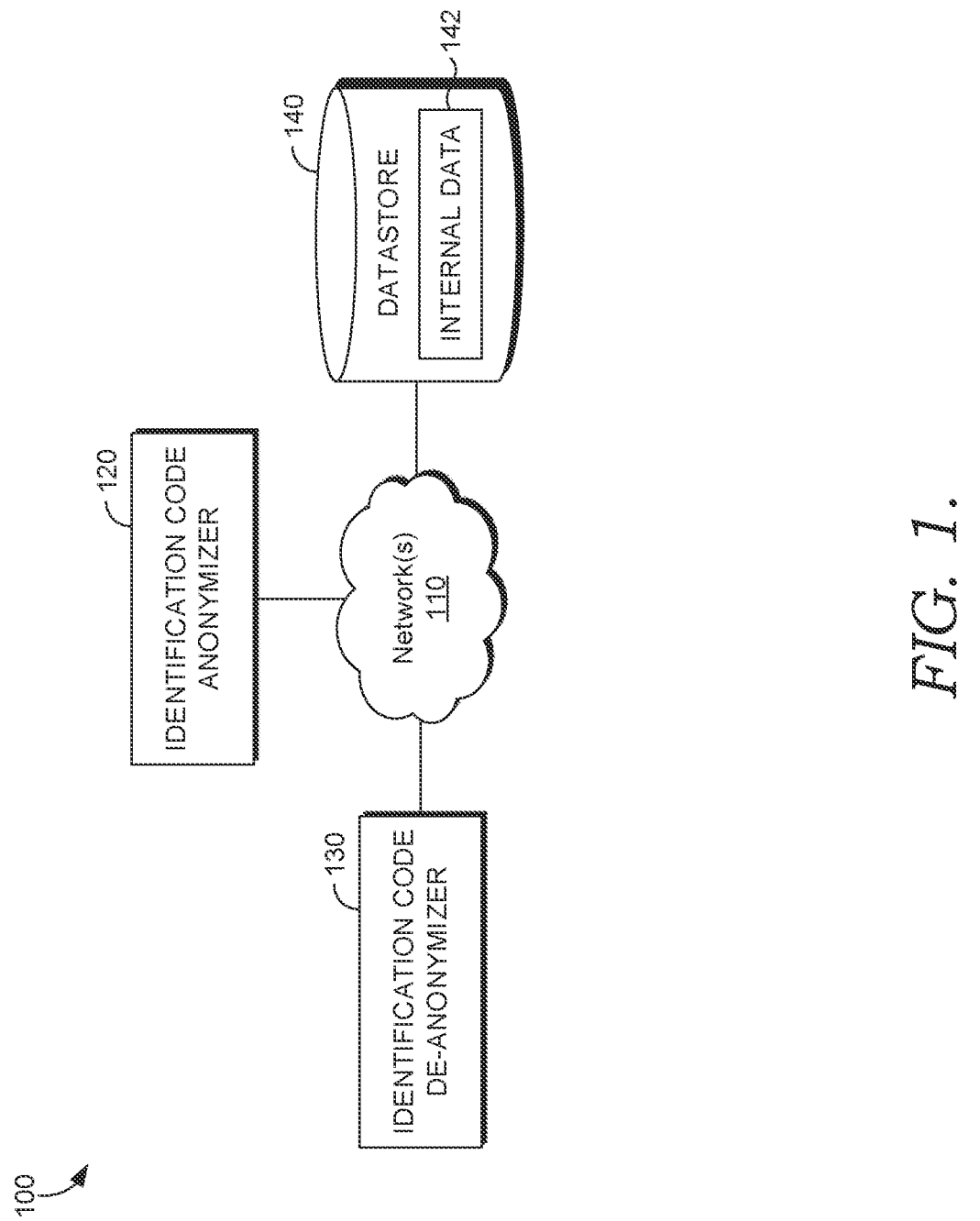

Having thus described the disclosure in general terms, reference will now be made to the accompanying drawings, which are not necessarily drawn to scale, and wherein:

FIG. 1 is a schematic diagram of an example system architecture in which aspects of the present disclosure are employed, according to some embodiments.

Figure 2:
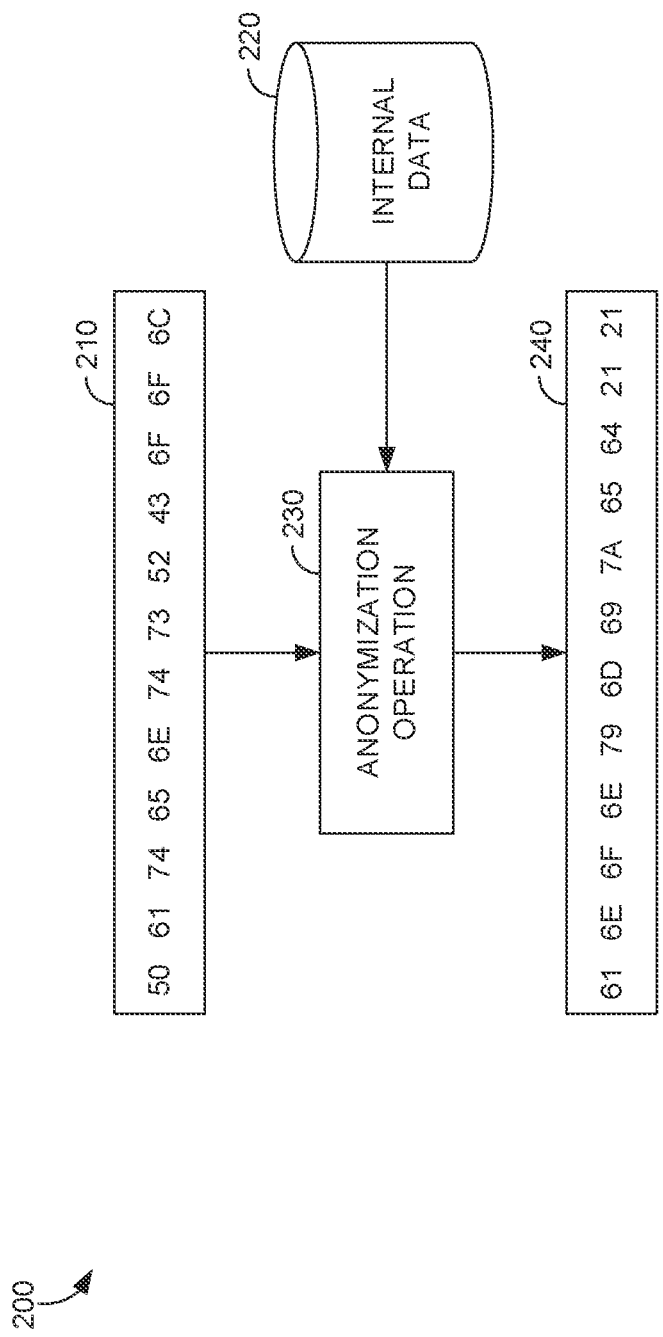

FIG. 2 is an example identification code anonymizer, according to some embodiments.

Figure 3:
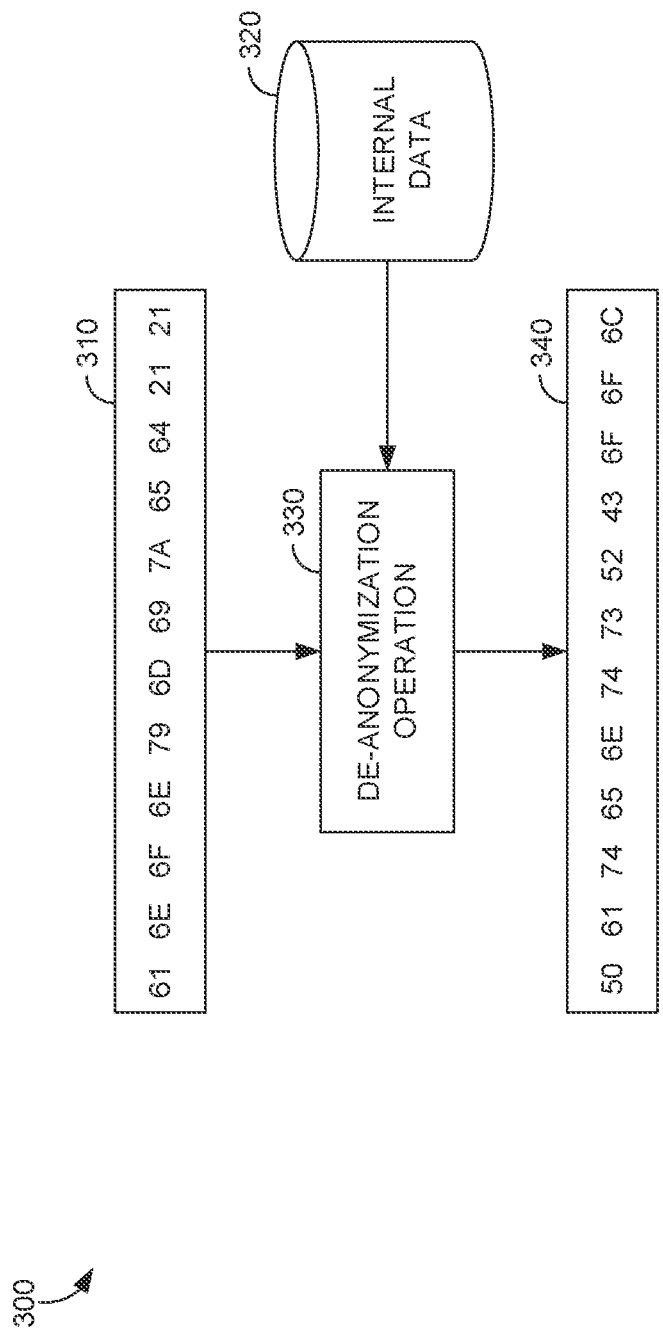

FIG. 3 is an example identification code de-anonymizer, according to some embodiments.

Figure 4:
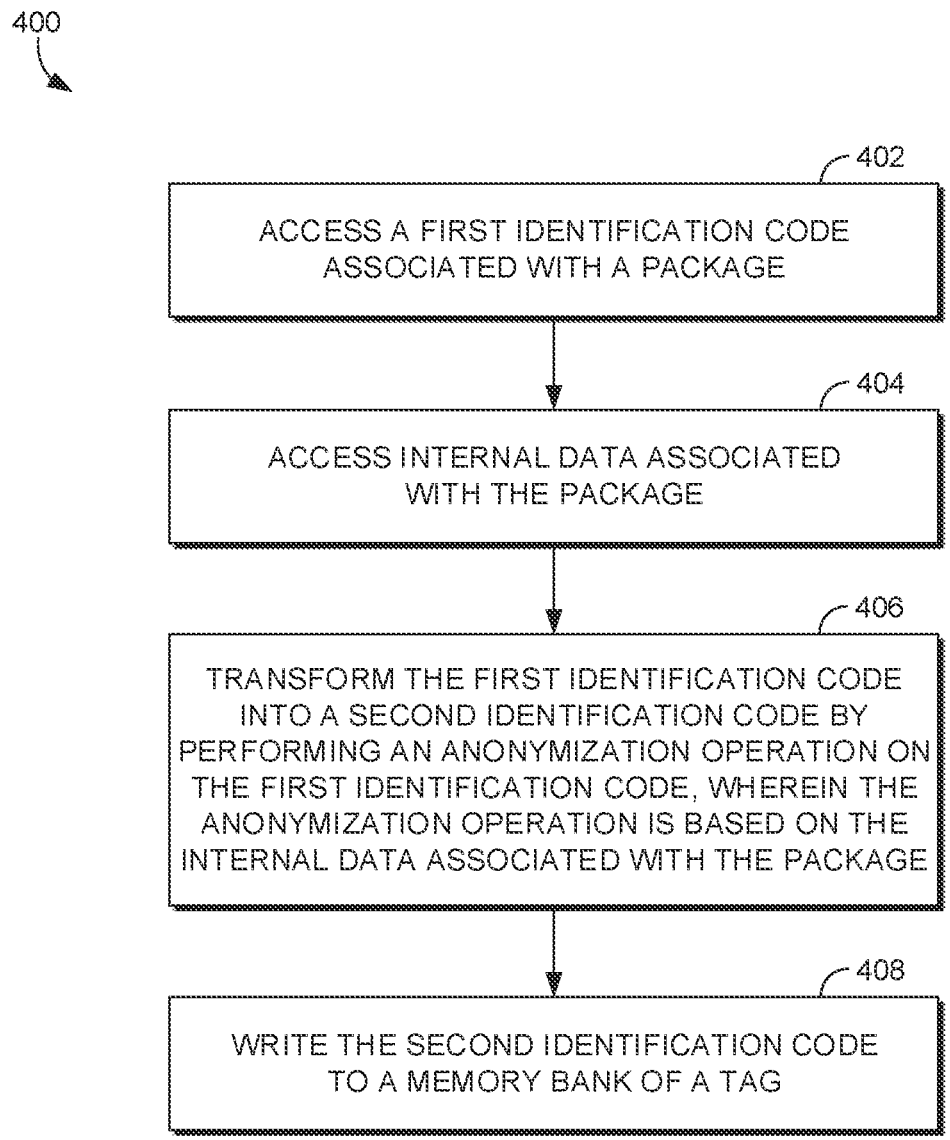

FIG. 4 is a flow diagram of an example process for anonymizing an identification code, according to some embodiments.

Figure 5:
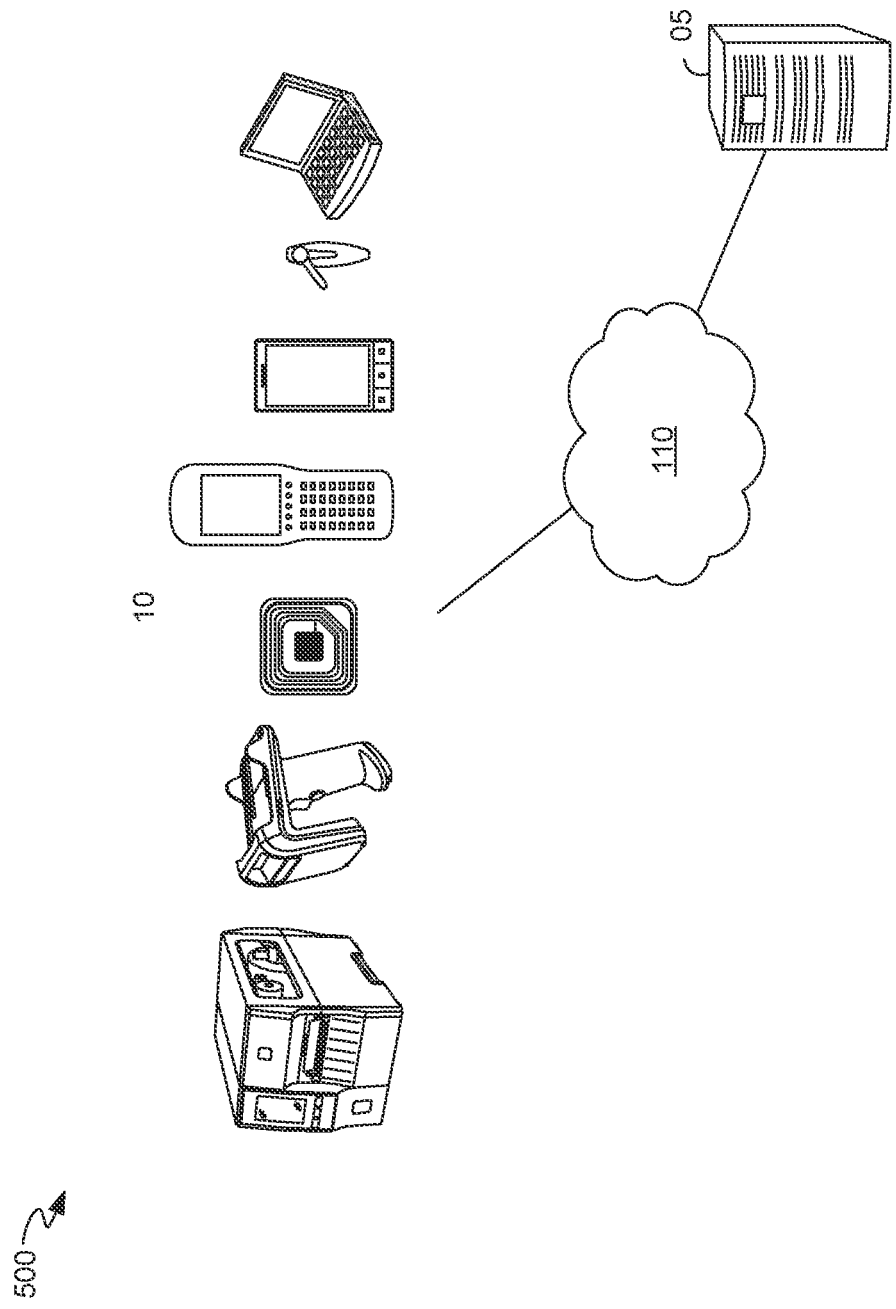

FIG. 5 is a schematic diagram of a computing environment in which aspects of the present disclosure are employed, according to some embodiments.

Figure 6:
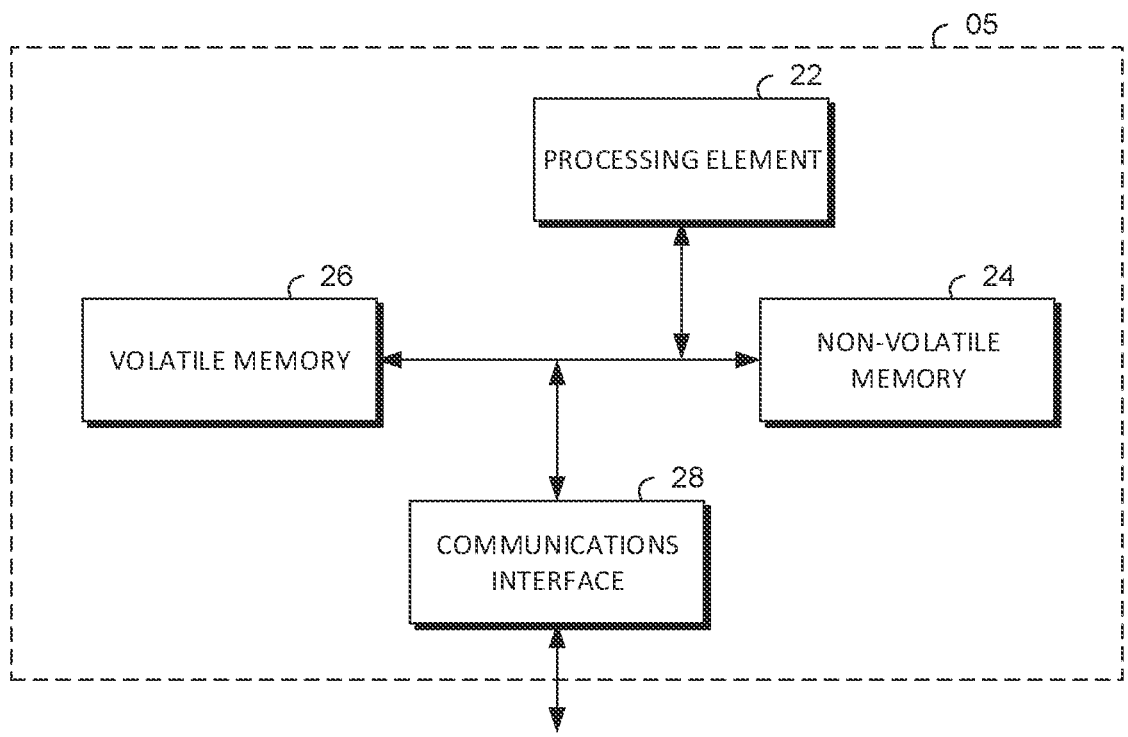

FIG. 6 is a schematic diagram of an analysis computing entity in which aspects of the present disclosure are employed, according to some embodiments.

Figure 7:
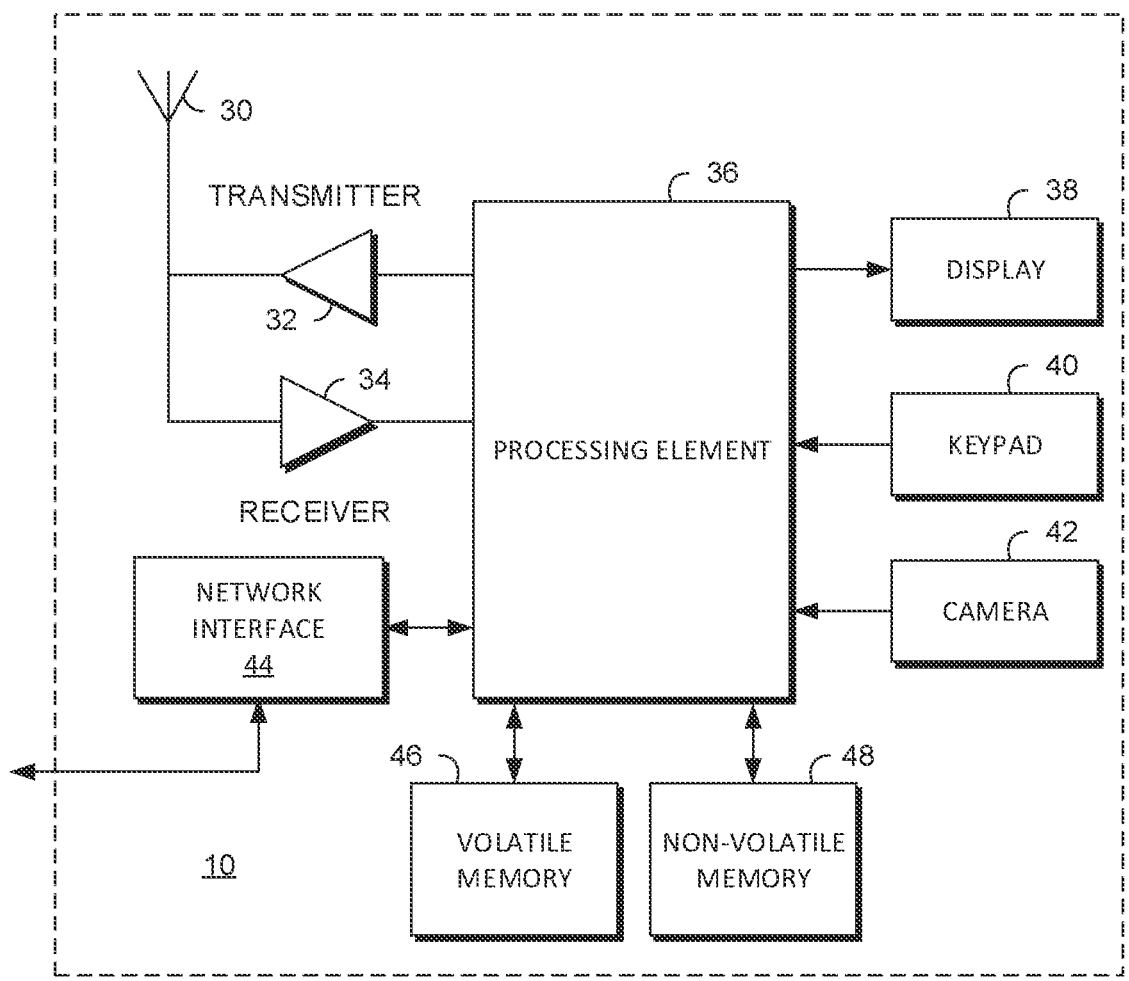

FIG. 7 is a schematic diagram of a mobile computing entity in which aspects of the present disclosure are employed, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

As described above, using identification tags (such as RFID tags) to identify and/or track assets (e.g., packages) entails security concerns, such as the ability of third parties to identify valuable packages. Some existing technologies, such as RFID-based technologies, do not anonymize data at all on identification tags, thereby providing easy access to the data and thus compromising security. Moreover, traditional approaches to securing data located on identification tags are inadequate in various contexts, such as the shipping context. For example, existing technologies apply full encryption to tag data. However, full encryption may be impractical in the shipping context for two reasons.

First, identification tags typically possess limited memory capacity. For example, Gen 2 RFID tags comprise three primary types of memory: tag identification (TID) memory, EPC memory, and reserved memory. Only the EPC memory is user-writable, and in many cases, EPC memory is only 96 bits in size. Full encryption generally requires far more storage space than 96 bits (for example), making it impractical or impossible to store fully encrypted data on many identification tags. Some RFID tags possess larger EPC memory banks and/or extended user memory, but (a) such tags may be far more expensive than tags with 96-bit EPC memory, making a full-encryption approach cost prohibitive given how many tags a shipper or other large entity may need to purchase in order to track a large volume of assets, and (b) in some cases, such tags may still lack the memory capacity necessary to store fully encrypted data.

Second, fully encrypting tag data carries a significant computer input/output (I/O) cost in various instances. For example, in order to fully encrypt tag data, a system may need to access the tag data to be encrypted, generate a unique pre-shared key (PSK) for the tag, and apply an encryption algorithm to the tag data. Then, in order to read the encrypted tag data, a reader may need to access identifying information associated with the tag (e.g., the tag's TID), query a database for the PSK associated with the tag (e.g., over a network), receive the PSK, and decrypt the tag data using the PSK.

What is needed is a way to secure or obfuscate data stored on identification tags having limited memory while minimizing the associated I/O costs.

Various embodiments of this disclosure provide one or more technical solutions to the technical problems described above. For example, particular embodiments are drawn to anonymizing and/or de-anonymizing tag data (e.g., an identification code) based on internal data. That is, tag data may be anonymized (e.g., obfuscated or scrambled) using information available (offline or via a network) to an encoding device (e.g., a tag printer or a reader) but not readily accessible by the general public. In some embodiments, the anonymization process utilizes cryptographic operations such that, unlike traditional encryption algorithms and technologies, the output (i.e., the anonymized tag data) is not larger in size than the original tag data. Thus, the anonymized tag data may be written to the identification tag without exceeding the tag's memory capacity. Moreover, this approach may avoid processes such as encryption, decryption, and/or database queries related to PSKs.

Various embodiments described herein improve the functioning of a computer in one or more of the following ways.

First, some embodiments described herein reduce input/output (I/O) costs (e.g., reduce physical read/write head movements on a non-volatile disk). As described above, some embodiments provide a more efficient, less computationally expensive alternative to traditional encryption. Traditional encryption algorithms are typically computationally expensive and require the generation, storage, and retrieval of unique PSKs for every item (e.g., tag) to be encrypted. In contrast, some embodiments described herein avoid the need to fully encrypt tag data by seeding an anonymization operation with internal data, masking potentially sensitive information without utilizing a conventional encryption algorithm or generating a unique PSK. Consequently, for example, there is less wear and tear on I/O components, such as a read-write head, reduced energy costs, and the like because there fewer I/O operations being performed.

Second, some embodiments described herein decrease queries to databases. For example, in a conventional system where tag data is fully encrypted, a reader may have to query a database to retrieve a PSK associated with the tag data. However, any given query to a database is expensive because in certain database management systems, such as relational database management systems, to execute a query, many optimization operations must occur, such as selectivity, cardinality, etc. in order to find the most efficient query execution plan to retrieve the data, thereby increasing computer latency. However, in some embodiments described herein, the reader de-anonymizes the tag data using internal data—e.g., data stored on the reader or physically (e.g., visually) accessible to the reader—which eliminates the need to query a database for a PSK. Consequently, for example, there is no need to perform typical optimization operations, such as selectivity, cardinality, and the like, thereby decreasing computer latency.

Third, because certain readers and tag printers conventionally retrieve PSKs (for example) over a network, embodiments described herein may decrease network costs traditionally associated with encrypting or decrypting tag data. Moreover, in some embodiments, the anonymization and/or de-anonymization steps may be carried out locally (e.g., by a reader), reducing or eliminating network and/or server costs. For example, particular embodiments avoid populating, breaking up, and then re-assembling data packets with metadata (e.g., data offsets and port numbers) and a payload in a network protocol (e.g., TCP/IP), thereby reducing latency, packet generation costs, and the like.

It is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Exemplary System Architecture

FIG. 1 is a block diagram of an illustrative system architecture 100 in which some embodiments of the present technology are employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., various analysis computing entities 05 of FIG. 5). In other embodiments, the system 100 is located at a single host or computing device (e.g., a single analysis computing entity or a mobile computing entity 10, as shown in FIG. 5). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SaaS) model, e.g., a cloud and/or web-based service. In other embodiments, the functionalities of system 100 may be implemented via a client/server architecture.

The system 100 is generally drawn to anonymizing and/or de-anonymizing an identification code based on internal data. The system 100 comprises an identification code anonymizer 120, an identification code de-anonymizer 130, and a datastore 140, each of which is communicatively coupled to network(s) 110.

The network(s) 110 can be any suitable network, such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 100.

The identification code anonymizer 120 is generally configured to anonymize (e.g., obfuscate, mask, encrypt, hash, or scramble) or otherwise de-identify information, such as an identification code 210. As later discussed, the operations the identification code anonymizer 120 may be configured to perform may be carried out by a reader (e.g., an RFID reader) or a tag printer (e.g., an RFID tag printer), for example.

FIG. 2 illustrates an exemplary identification code anonymizer 200, which may correspond to identification code anonymizer 120.

The identification code anonymizer 200 may access an identification code 210. The identification code 210 may be associated with an asset, for example. An "asset" as described herein is any tangible item that is capable of being transported from one location to another. Assets may be or include the contents that enclose a product (such as a shipping container), the product itself, or other items people wish to ship. For example, an asset may be or include a parcel or group of parcels, a package or group of packages, a box, a crate, a drum, a container, a box strapped to a pallet, an envelope, a bag of small items, and/or the like. The identification code 210 may comprise data used to identify the asset. In some embodiments, the identification code 210 may be or comprise shipper information, such as information regarding or associated with an identity of a shipper of the asset, asset identity information (e.g., information regarding contents of the asset or a type of the asset), or information regarding a destination of the asset, for example. The identification code 210 may comprise hexadecimal data, ASCII characters, or any other form of data.

The identification code anonymizer 200 may access the identification code 210 in any of a variety of ways. For example, the identification code 210 may be accessed over one or more networks, such as network(s) 110. As mentioned, in some embodiments, the operations carried out by the identification code anonymizer 200 may be performed by a tag printer—e.g., when encoding and/or printing a tag. In such embodiments, the tag printer accesses the identification code 210 over network(s) 110. In other embodiments, the operations carried out by the identification code anonymizer 120 are performed by a reader. In these embodiments, the identification code 210 may be accessed by the reader from a tag—e.g., a tag associated with an asset. For example, the tag from which the identification code 210 is accessed may comprise EPC memory (as later discussed), and the identification code 210 may be stored in, and accessed from, the tag's EPC memory.

The identification code anonymizer 200 may perform an anonymization operation 230 on the identification code 210. At a high level, a purpose of the anonymization operation 230 may be to anonymize, mask, obfuscate, or scramble the identification code 210, which may produce an anonymized identification code 240 not readily comprehensible to external observers.

The anonymization operation 230 may be based on internal data 220. Internal data 220 may comprise data to which the public does not (or does not readily) have access, such as internal business knowledge (e.g., knowledge or data that belongs to a business by whom or on whose behalf the anonymization operation 230 is performed). In some embodiments, the internal data 220 comprises package/asset data or is otherwise is associated with an asset—e.g., an asset associated with the identification code 210. For example, the internal data 220 may be or comprise an asset weight, an address to which the asset is to be delivered, a tracking identification number to track the asset, a service type, and/or a time at which the asset was shipped, for example. The term "service type" refers to the categorization of the service provided associated with the asset. For example, service type may be categorized by delivery speed, return receipt requested, insurance associated with the asset, originating location, destination location, and the like. Exemplary service types include "Next Day Air", "2nd Day Air", "Worldwide Express", "Standard", and the like.

In some embodiments, the internal data 220 includes any information contained in a package manifest. The term "package manifest" refers to a report provided by a shipper to a shipping service provider that summarizes the shipment information about the package that the shipper is going to provide to the shipping service provider. In some embodiments, a package manifest includes the shipper's account information, shipping record identifier, dimensions of the package to be picked up (e.g., length, width, and height of package), a planned package pick up time, a package pick up location, package weight, the planned package pick up and/or delivery time in the package manifest, and the like. For example, a shipper may request that a shipping service provider send a driver to pick up a package at a certain location (manifest package location) at a manifest package time. In embodiments in which the internal data 220 is not associated with the package, the internal data 220 may comprise any data accessible to the device performing the anonymization operation 230 but not accessible (or readily accessible) by the general public, such as internal business fields, pre-generated keys, and so on.

In some embodiments, internal data 220 additionally or alternatively includes information associated with other industries, such as warehousing or retail inventory. For example, in some embodiments, the internal data 220 includes the quantity of items of the same type in inventory, date of sale, how long an item has been in inventory, when an item arrived in a warehouse, and the like.

In some embodiments, the internal data 220 may be stored in a datastore 140 (as later discussed). In other embodiments, the internal data 220 may be present on a tag and/or on a shipping label—e.g., a tag or shipping label associated with an asset associated with the identification code 210. In the latter case(s) (i.e., when the internal data 220 is stored in an "offline" source such as the shipping label or the tag), the anonymization operation 210 may occur (or be capable of occurring) entirely offline, reducing network costs and/or database queries. In such embodiments, a reader (or any other device performing the anonymization operation 230) may access the internal data 220 by reading a tag associated with (e.g., affixed to) the asset, reading a label associated with (e.g., affixed to) the asset, or scanning a barcode associated with (e.g., affixed to) the asset, for example.

The anonymization operation 230 may be based on the internal data 220. For example, the anonymization operation 230 may be seeded with the internal data 220. The anonymization operation 230 may comprise one or more steps that require some or all of the internal data 220. For example, the anonymization operation 230 may comprise a cryptographic operation. The cryptographic operation may comprise hashing, use of a logical operator, use of a shifting cypher, or a combination thereof. To illustrate, if the anonymization operation 230 comprises the use of the logical operator "OR," the identification code is the hexadecimal value 6869, and the internal data is the hexadecimal value 1337, the output (e.g., the anonymized identification code) would be 6869 OR 1337, which is equivalent to the hexadecimal value 7B7F. In some embodiments, additional steps may be applied in order to further anonymize the identification code 210, such as shifting characters—e.g., based on the internal data. Continuing with the previous example, the anonymization operation 230 could further comprise modifying the output 7B7F by decreasing the value of each character by 1, since 1 is the first digit of the internal data. This would produce an anonymized identification code comprising a value of 6A6E.

The anonymization operation 230 may also comprise a compression step. A goal of the compression step may be to reduce the amount of data used in one or more steps of the anonymization operation 230—for example, so that an output (e.g., the anonymized identification code 240) is small enough to fit in the tag's memory. This may be accomplished by discarding redundant, unused, or irrelevant characters or data in the identification code 210 and/or in the internal data 220.

The anonymized identification code 240 may be an output of anonymization operation 230. Accordingly, the anonymized identification code 240 may comprise anonymized data associated with identification code 210. The anonymized identification code 240 may comprise hexadecimal data, ASCII characters, or any other form of data.

The identification code de-anonymizer 130 may generally be configured to de-anonymize (e.g., unmask, decrypt, de-obfuscate, identify, or unscramble) information, such as an anonymized identification code 310. As later discussed, the operations the identification code de-anonymizer 130 may be configured to perform may be carried out by a reader (e.g., an RFID reader), for example.

FIG. 3 illustrates an exemplary identification code de-anonymizer 300. The identification code de-anonymizer 300 may correspond to the identification code de-anonymizer 130 of FIG. 1.

The identification code de-anonymizer 300 may access an anonymized identification code 310. The anonymized identification code 310 may have any or all of the same properties as the anonymized identification code 240 and may be accessed in any of the ways described above with reference to the identification code 210. For example, the anonymized identification code 310 may be accessed by reading data stored on a tag (e.g., stored in EPC memory of an RFID tag).

Internal data 320 may have any or all of the same characteristics as the internal data 220.

The identification code de-anonymizer 300 may perform a de-anonymization operation 330 on the anonymized identification code 310, which may produce identification code 340. The de-anonymization operation 330 may, for example, reverse or undo steps or operations associated with the anonymization operation 230. The de-anonymization operation 330 may be based on the internal data 320. For example, the de-anonymization operation 330 may use the internal data 320 to decode, decrypt, unmask, or unscramble the anonymized identification code 310. The de-anonymization operation 330 may comprise one or more steps that require some or all of the internal data 320. For example, the de-anonymization operation 330 may comprise a cryptographic operation. The cryptographic operation may comprise hashing, use of a logical operator, use of a shifting cypher, or a combination thereof. The cryptographic operation(s) performed as part of the de-anonymization operation 330 may reverse or undo the cryptographic operation(s) performed by the anonymization component 230.

The de-anonymization operation 330 may also comprise a decompression step. A goal of the decompression step may be to increase an amount of data present in the anonymized identification code 310 (e.g., restore data that was present in the identification code 210 prior to performing the compression step).

The de-anonymization operation 330 may produce or output an identification code 340. The identification code 340 may correspond to or be identical to the identification code 210.

III. Example System Operation

FIG. 4 is a flow diagram of an example process 400 for anonymizing an identification code, according to some embodiments. In some embodiments, an analysis computing entity 05 of FIG. 5, such as a tag printer (e.g., an RFID printer) or a reader (e.g., an RFID reader) performs the process 400. In yet other embodiments, the combination of the analysis computing entity 05 and a computing entity 10 (of FIG. 5) performs the process 400. The process 400 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIGS. 1-3). The computer-implemented method, the system (that includes at least one computing device having at least one processor and at least one computer readable storage medium), and/or the computer program product/computer storage media as described herein may perform or be caused to perform the process 400, and/or any other functionality described herein.

Per block 402, some embodiments access a first identification code. The first identification code may be associated with an asset. The asset may be a parcel in a logistics network. The first identification code may be stored in and/or accessed from a server, a database, or a tag, for example. The first identification code may comprise shipper information—e.g., information regarding an identity of a shipper of the asset. The first identification code may be less than or equal to 96 bits in size.

Per block 404, some embodiments access internal data. The internal data may be associated with the asset. (However, in other embodiments, the internal data may not be associated with the asset.) The internal data may be stored in a database, in a datastore, and/or on label associated with (and/or affixed to) the asset, for example. The internal data may comprise one or more of a weight of the asset, an address associated with the asset, and a tracking ID associated with the asset, for example. The internal data may comprise internal business knowledge that is not publicly accessible.

Per block 406, some embodiments transform the first identification code into a second identification code by performing an anonymization operation on the first identification code. The anonymization operation may be based on the internal data, which, as previously discussed, may be associated with the asset. The anonymization operation may comprise a cryptographic operation. The second identification code may be less than or equal to 96 bits in size.

Per block 408, some embodiments write the second identification code to a memory bank of a tag. The second identification code may be written to a memory bank of a tag by a tag printer (e.g., an RFID tag printer) or a reader (e.g., an RFID reader), for example. The tag may be an RFID tag, for example. The memory bank of the tag may EPC memory of an RFID tag.

IV. Apparatuses, Methods, and Systems

Embodiments of the present disclosure may be implemented in various ways, including as apparatuses that comprise articles of manufacture. An apparatus or system may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described above with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

V. Example Computing Environment

FIG. 5 is a schematic diagram of an example computing environment 500 in which aspects of the present disclosure are employed, according to some embodiments. As shown in FIG. 5, the computing environment 500 may include one or more analysis computing entities 05 (e.g., a shipping company mainframe, cloud computing nodes, and/or a logistics store desktop), and/or one or more mobile computing entities 10 (e.g., a mobile device, such as a delivery information acquisition device (DIAD) or mobile phone, a tag printer, a reader, or a tag), some or all of which may be communicatively coupled via one or more networks 110.

In some embodiments, "communicatively coupled" means that two or more components can perform data transportation between each other via a wired (e.g., Ethernet or fiber-optic medium connected in a LAN) or wireless (e.g., IEEE 802.15.4) computer protocol network. Each of these components, entities, devices, systems, and similar words used herein interchangeably may be in direct or indirect communication with one another over, for example, the same or different wired and/or wireless networks. Additionally, while FIG. 5 illustrates the various system entities as separate, standalone entities, the various embodiments are not limited to this particular architecture. In some embodiments, there are more or fewer (or combined) components than illustrated in the environment 500.

In some embodiments, one or more components of the computing environment 500 represent corresponding components as described herein. For example, in some embodiments, the mobile computing entity 10 represents or comprises the tag printer, reader, or tag described herein. In some embodiments, the analysis computing entity 05 represents a "database," "datastore," and/or "server" as described herein.

In some embodiments, some or all of the components of the system 100 of FIG. 1 are located within the analysis computing entity 05. In some embodiments, the components of the system 100 of FIG. 1 are distributed among the components of the environment 500. In some embodiments, the components of system 100 of FIG. 1 are located within one or more of the mobile computing entities 10. For example, in some embodiments, the identification code anonymizer 120 and/or de-anonymizer 130 are located within a tag printer and/or reader.

In various embodiments, the network(s) 110 represents or includes an IoT (internet of things) or IoE (internet of everything) network, which is a network of interconnected items (e.g., any of the mobile computing entities 10 and/or the analysis computing entity 05) that are each provided with unique identifiers (e.g., UIDs) and computing logic so as to communicate or transfer data with each other or other components. Such communication can happen without requiring human-to-human or human-to-computer interaction. For example, an IoT network may include the mobile computing entity 10 that includes an application, which sends a request, via the network(s) 110, to the analysis computing entity 05 to retrieve an identification code, retrieve internal data, or perform an anonymization or de-anonymization operation, for example. Responsively, the tag printer and/or reader may, for example, perform additional operations and/or write an identification code (e.g., an anonymized identification code) to a tag. In the context of an IoT network, a computing device can be or include one or more local processing devices (e.g., edge nodes) that are one or more computing devices configured to store and process, over the network(s) 110, either a subset or all of the received or respective sets of data to the one or more remote computing devices (e.g., the mobile computing entities 10 and/or the analysis computing entity 05) for analysis.

In some embodiments, the local processing device(s) described above is a mesh or other network of microdata centers or edge nodes that process and store local data received from the mobile computing entity 10 (e.g., a user device) and/or the analysis computing entity 05, and push or transmit some or all of the data to a cloud device or a corporate data center that is or is included in the one or more analysis computing entities 05. In some embodiments, the local processing device(s) store all of the data and only transmit selected (e.g., data that meets a threshold) or important data to the analysis computing entity 05. Accordingly, the non-important data or the data that is in a group that does not meet a threshold is not transmitted. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 110. Accordingly, in these embodiments, the one or more local processing devices can be associated with one or more gateway devices that translate proprietary communication protocols into other protocols, such as internet protocols.

VI. Exemplary Analysis Computing Entity

FIG. 6 is a block diagram of the analysis computing entity 05 of FIG. 5, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

In particular embodiments, the analysis computing entity 05 may also include one or more communications interfaces for communicating with various computing entities, such as by communicating data, content, information/data, and/or similar terms used herein interchangeably that can be transmitted, received, operated on, processed, displayed, stored, and/or the like.

As shown in FIG. 6, in particular embodiments, the analysis computing entity 05 may include or be in communication with one or more processing elements 22 (also referred to as processors, processing circuitry, and/or similar terms used herein interchangeably) that communicate with other elements within the analysis computing entity 05 via a bus, for example. As will be understood, the processing element 22 may be embodied in a number of different ways. For example, the processing element 22 may be embodied as one or more complex programmable logic devices (CPLDs), microprocessors, multi-core processors, coprocessing entities, application-specific instruction-set processors (ASIPs), microcontrollers, and/or controllers. Further, the processing element 22 may be embodied as one or more other processing devices or circuitry. The term circuitry may refer to an entirely hardware embodiment or a combination of hardware and computer program products. Thus, the processing element 22 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 22 may be configured for a particular use or configured to execute instructions stored in volatile or non-volatile media or otherwise accessible to the processing element 22. As such, whether configured by hardware or computer program products, or by a combination thereof, the processing element 22 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 24, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media 24 may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media (also referred to as volatile storage, memory, memory storage, memory circuitry and/or similar terms used herein interchangeably). In particular embodiments, the volatile storage or memory may also include one or more volatile storage or memory media 26, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media 26 may be used to store at least portions of the databases, database instances, database management systems, data, applications, programs, program modules, scripts, source code, object code, byte code, compiled code, interpreted code, machine code, executable instructions, and/or the like being executed by, for example, the processing element 22. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 05 with the assistance of the processing element 22 and operating system.

As indicated, in particular embodiments, the analysis computing entity 05 may also include one or more communications interfaces 28 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

VII. Example Mobile Computing Entities

Turning now to FIG. 7, a block diagram of a mobile computing entity 10 of FIG. 5, according to some embodiments. In certain embodiments, mobile computing entity(s) 10 may be embodied as handheld computing entities, such as mobile phones, tablets, personal digital assistants, readers, tags, tag printers, and/or the like, that may be operated at least in part based on user input received from a user via an input mechanism. It should be understood that various embodiments of the present disclosure may comprise a plurality of mobile computing entities 10 embodied in one or more forms (e.g., kiosks, mobile devices, watches, laptops, carrier personnel devices (e.g., delivery information acquisition devices (DIADs)), tag printers, readers, tags, etc.)

As will be recognized, a user may be an individual, a family, a company, an organization, an entity, a department within an organization, a representative of an organization and/or person, and/or the like-whether or not associated with a carrier. In particular embodiments, a user may operate a mobile computing entity 10 that may include one or more components that are functionally similar to those of the analysis computing entity 05. This figure provides an illustrative schematic representative of a mobile computing entity 10 that can be used in conjunction with embodiments of the present disclosure. In general, the terms device, system, mobile computing entity, user device, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, tags, tag printers, readers, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Mobile computing entity(s) 10 can be operated by various parties, including carrier personnel (sorters, loaders, delivery drivers, network administrators, and/or the like). As shown this figure, the mobile computing entity(s) 10 can include an antenna 30, a transmitter 32 (e.g., radio), a receiver 44 (e.g., radio), and a processing element 36 (e.g., CPLDs, microprocessors, multi-core processors, coprocessing entities, ASIPs, microcontrollers, and/or controllers) that provides signals to and receives signals from the transmitter 32 and receiver 34, respectively. In some embodiments, the mobile computing entity(s) 10 additionally includes other components not shown, such as a fingerprint reader, a printer, and/or the camera.

The signals provided to and received from the transmitter 32 and the receiver 34, respectively, may include signaling information in accordance with air interface standards of applicable wireless systems. In this regard, the mobile computing entity(s) 10 may be capable of operating with one or more air interface standards, communication protocols, modulation types, and access types. More particularly, the mobile computing entity(s) 10 may operate in accordance with any of a number of wireless communication standards and protocols, such as those described above with regard to the analysis computing entity(s) 05. In a particular embodiment, the mobile computing entity(s) 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, RF, and/or the like. Similarly, the mobile computing entity(s) 10 may operate in accordance with multiple wired communication standards and protocols, such as those described above with regard to the analysis computing entity(s) 05 via a network interface 44.

Via these communication standards and protocols, the mobile computing entity(s) 10 can communicate with various other entities using concepts such as unstructured supplementary service information/data (USSD), Short Message Service (SMS), Multimedia Messaging Service (MMS), dual-tone multi-frequency signaling (DTMF), and/or subscriber identity module dialer (SIM dialer). The mobile computing entity(s) 10 can also download changes, add-ons, and updates, for instance, to its firmware, software (e.g., including executable instructions, applications, program modules), and operating system.

According to particular embodiments, the mobile computing entity(s) 10 may include location determining aspects, devices, modules, functionalities, and/or similar words used herein interchangeably. For example, the mobile computing entity(s) 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the mobile computing entity(s) 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing entity(s) 10 may also comprise a user interface (that can include a display 38 coupled to a processing element 36) and/or a user input interface (coupled to a processing element 36). For example, the user interface may be a user application, browser, user interface, and/or similar words used herein interchangeably executing on and/or accessible via the mobile computing entity 10 to interact with and/or cause display of information from the analysis computing entity 05, as described herein. The user input interface can comprise any of a number of devices or interfaces allowing the mobile computing entity(s) 10 to receive information/data, such as a keypad 40 (hard or soft), a touch display, voice/speech or motion interfaces, or other input device. In embodiments including a keypad 40, the keypad 40 can include (or cause display of) the conventional numeric (0-9) and related keys (#, *), and other keys used for operating the mobile computing entity(s) 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in this figure, the mobile computing entity(s) 10 may also include an camera 42, imaging device, and/or similar words used herein interchangeably (e.g., still-image camera, video camera, IoT enabled camera, IoT module with a low resolution camera, a wireless enabled MCU, and/or the like) configured to capture images. The mobile computing entity(s) 10 may be configured to capture images via the onboard camera 42, and to store those imaging devices/cameras locally, such as in the volatile memory 46 and/or non-volatile memory 48. As discussed herein, the mobile computing entity(s) 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 42. The contextual data may be stored as a portion of the image (such that a visual representation of the image data includes the contextual data) and/or may be stored as metadata associated with the image data that may be accessible to various computing entity(s) 10.

The mobile computing entity(s) 10 may include other input mechanisms, such as scanners (e.g., barcode scanners), microphones, accelerometers, RFID readers, and/or the like configured to capture and store various information types for the mobile computing entity(s) 10. For example, a scanner may be used to capture parcel/item/shipment information/data from an item indicator disposed on a surface of a shipment or other item. In certain embodiments, the mobile computing entity(s) 10 may be configured to associate any captured input information/data, for example, via the onboard processing element 36. For example, scan data captured via a scanner may be associated with image data captured via the camera 42 such that the scan data is provided as contextual data associated with the image data.

The mobile computing entity(s) 10 can also include volatile storage or memory 46 and/or non-volatile storage or memory 48, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile computing entity(s) 10. As indicated, this may include a user application that is resident on the entity or accessible through a browser or other user interface for communicating with the analysis computing entity 05 and/or various other computing entities.

In another embodiment, the mobile computing entity(s) 10 may include one or more components or functionality that are the same or similar to those of the analysis computing entity 05, as described in greater detail above. As will be recognized, these architectures and descriptions are provided for exemplary purposes only and are not limiting to the various embodiments.

As discussed above, and as depicted in FIG. 5, the mobile computing entity 10 may comprise a reader, a tag, and/or a tag printer, for example.

The reader is generally responsible for interrogating or reading data emitted from or located on the tag. The reader may also write data to the tag. The reader may be any suitable reader machine, manufacture, or module. For example, the reader can be an RFID reader, a near-field communication (NFC) reader, optical scanner, optical reader, bar code scanner, magnetic ink character recognition reader, beacon reader, Bluetooth beacon (e.g., a Bluetooth Low Energy (BLE) beacon), or the like. The reader can be a low-frequency (LF), high-frequency (HF), or ultra-high-frequency (UHF) reader, for example. The reader can be coupled to or placed in any suitable location, such as a particular distance, orientation, and/or height from storage unit, on the ceiling of a building, on the floor of the building, one the walls of the building, and/or on any structure within a geographical area. In some embodiments, the reader may be a handheld device.

The tag(s) are typically attached or otherwise coupled to asset(s) which need to be loaded into a particular logistics vehicle, are present inside a logistics vehicle, or have been unloaded from a logistics vehicle. The tag(s) are generally responsible for indicating or emitting/transmitting data (e.g., to a reader), such as an identifier that identifies the respective tag and/or properties thereof. A tag may be or include any suitable tag, machine, manufacture, module, and/or computer-readable indicia. "Computer-readable indicia" as described herein is any tag (e.g., RFID or NFC tag) information, bar code, data matrix, numbers, lines, shapes, and/or other suitable identifier that is machine-readable (and tends not to be readable by a human) because machines can process the data.

In some embodiments, a "tag" as described herein is any physical object that stores, at minimum, an identifier that identifies the tag. The identifier (and potentially other data) is configured to be read by a reader device. For example, in some embodiments, a tag may be an RFID tag, which can include an antenna or radio (for transmitting and receiving its tag ID) and an RFID chip (e.g., an integrated circuit), which stores the tag's ID and other information. In another example, a tag is or includes a paper label with a matrix or barcode with an encoded ID. In some embodiments, a tag may be compatible with a Bluetooth system (e.g., a Bluetooth Low Energy (BLE) beacon).

A tag may comprise one or more memory banks. For example, a tag, such as an RFID tag, may comprise reserved memory, tag identifier (TID) memory, electronic product code (EPC) memory, and/or user memory. TID memory may store the identifier that identifies the tag. EPC memory may be user-readable and user-writable. EPC memory may be 96 bits in size. In some embodiments, EPC memory may be more than 96 bits in size—e.g., up to 512 bits, up to 4,000 bits, or up to 8,000 bits.

In some embodiments, any reader-tag combination described herein may be part of an RFID system. Accordingly, these components may include the components and functionality of RFID tags and readers, for example. RFID is a way to store and retrieve data through electromagnetic transmission to an RF compatible integrated circuit. An RFID reader device can read data emitted from or located within RFID tags. RFID readers and tags use a defined radio frequency and protocol to transmit or provide (via tags) and receive (via readers) data. RFID tags are categorized as at least passive or active. Passive RFID tags operate without a battery. They reflect the RF signal transmitted to them from a reader device and add information by modulating the reflected signal. Their read ranges are limited relative to active tags. Active tags contain both a radio transceiver and a battery to power the transceiver. Since there is an onboard radio on the tag, active tags have more range than passive tags. It is noted, however, that the reader devices or tags need not be a part of RFID protocols, but can alternatively or additionally include other protocols, such as Bluetooth low energy (BLE), bar codes, QR codes, and the like.

The tag printer may comprise a device capable of printing and/or encoding tags (e.g., RFID tags), for example. In some embodiments, the tag printers is an RFID printer. The tag printer may be configured to receive instructions and/or data—e.g., over the network(s) 110—and print and/or encode a tag with data (which may comprise or be based on the received instructions and/or data). For example, in accordance with aspects described herein, the tag printer may receive an instruction to print a tag comprising an identification code, write the identification code to memory associated with the tag (e.g., EPC memory associated with an RFID tag), and print the tag.

VIII. Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first identification code), second (e.g., second identification code), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity.

The term "causing" or "cause" means that one or more systems (e.g., computing devices) and/or components (e.g., processors) may in in isolation or in combination with other systems and/or components bring about or help bring about a particular result or effect. For example, a server may "cause" a message to be displayed by a computing entity and/or the same computing entity may "cause" the same message to be displayed (e.g., via a processor that executes instructions and data in a display memory of the user device). Accordingly, one or both systems may in isolation or together "cause" the effect of displaying a message.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A computer-implemented method comprising: accessing a first identification code associated with an asset; accessing internal data associated with the asset; transforming the first identification code into a second identification code by performing an anonymization operation on the first identification code, wherein the anonymization operation is based on the internal data associated with the asset; and writing the second identification code to a memory bank of a tag. Related embodiments reduce I/O costs, decrease queries to databases, and/or decrease network costs by anonymizing the identification code based on the internal data, for example.

Clause 2. The computer-implemented method of clause 1, wherein the tag is a radio-frequency identification (RFID) tag.

Clause 3. The computer-implemented method of clause 2, wherein the memory bank is an electronic product code (EPC) memory bank of the RFID tag.

Clause 4. The computer-implemented method of any of clauses 1-3, wherein the transforming the first identification code into the second identification code further comprises performing a compression step such that the second identification code is less than or equal to 96 bits in size.

Clause 5. The computer-implemented method of any of clauses 1-4, wherein the anonymization operation comprises a cryptographic operation.

Clause 6. The computer-implemented method of any of clauses 1-5, wherein the internal data associated with the asset on which the anonymization operation comprises one or more of a weight of the asset, an address associated with the asset, and a tracking ID associated with the asset.

Clause 7. The computer-implemented method of any of clauses 1-6, wherein the identification code comprises shipper information.

Clause 8. A system comprising: a radio frequency identification (RFID) tag comprising an encoded identification code stored in electronic product code (EPC) memory, wherein the encoded identification code is associated with an asset; and an RFID reader configured to: read the encoded identification code from the EPC memory; and transform the encoded identification code into a decoded identification code by performing a de-anonymization operation on the encoded identification code, wherein the de-anonymization operation is based on internal data. Related embodiments reduce I/O costs, decrease queries to databases, and/or decrease network costs by anonymizing the identification code based on the internal data, for example.

Clause 9. The system of clause 8, wherein the internal data is associated with the asset.

Clause 10. The system of any of clauses 8-9, wherein the internal data comprises one or more of a weight of the asset, an address associated with the asset, and a tracking ID associated with the asset.

Clause 11. The system of any of clauses 8-10, wherein the internal data comprises internal business knowledge that is not publicly accessible.

Clause 12. The system of any of clauses 8-11, wherein the internal data is not associated with the asset.

Clause 13. The system of any of clauses 8-12, wherein the RFID tag is affixed to the asset.

Clause 14. The system of any of clauses 8-13, wherein the de-anonymization operation comprises a cryptographic operation.

Clause 15. A system comprising: at least one computer processor; and one or more computer storage media storing computer-useable instructions that, when used by the at least one computer processor, cause the at least one computer processor to perform operations comprising: reading a first identification code from a tag affixed to an asset; transforming the first identification code into a second identification code by performing a cryptographic operation on the first identification code, wherein the cryptographic operation is based on internal data. Related embodiments reduce I/O costs, decrease queries to databases, and/or decrease network costs by anonymizing the identification code based on the internal data, for example.

Clause 16. The system of clause 15, wherein the second identification code is associated with an identity of a shipper of the asset.

Clause 17. The system of any of clauses 15-16, wherein the tag is a radio-frequency identification (RFID) tag.

Clause 18. The system of clause 17, wherein the reading the first identification code comprises accessing electronic product code (EPC) memory of the RFID tag.

Clause 19. The system of any of clauses 15-18, wherein the first identification code is less than or equal to 96 bits in size.

Clause 20. The system of any of clauses 15-19, wherein the internal data comprises one or more of a weight of the asset, an address associated with the asset, and a tracking ID associated with the asset.

What is claimed is:

1. A computer-implemented method comprising:
   accessing a first identification code associated with an asset;
   accessing internal data associated with the asset, wherein the internal data is not publicly accessible;
   transforming the first identification code into a second identification code by performing an anonymization operation on the first identification code, wherein the anonymization operation comprises seeding the first identification code with the internal data associated with the asset via a logical operator to generate output and shifting characters of the output based at least in part on the internal data to generate the second identification code; and
   writing the second identification code to a memory bank of a tag.

2. The computer-implemented method of claim 1, wherein the tag is a radio-frequency identification (RFID) tag.

3. The computer-implemented method of claim 2, wherein the memory bank is an electronic product code (EPC) memory bank of the RFID tag.

4. The computer-implemented method of claim 2, wherein the transforming the first identification code into the second identification code further comprises performing a compression step such that the second identification code is less than or equal to 96 bits in size.

5. The computer-implemented method of claim 1, wherein the anonymization operation comprises a cryptographic operation.

6. The computer-implemented method of claim 1, wherein the internal data associated with the asset comprises one or more of a weight of the asset, an address associated with the asset, and a tracking identifier associated with the asset.

7. The computer-implemented method of claim 1, wherein the first identification code comprises shipper information.

8. A system comprising:
   a radio frequency identification (RFID) tag comprising an encoded identification code stored in electronic product code (EPC) memory, wherein the encoded identification code is associated with an asset; and
   an RFID reader configured to:
      read the encoded identification code from the EPC memory; and
      transform the encoded identification code into a decoded identification code by performing a de-anonymization operation on the encoded identification code, wherein the de-anonymization operation comprises shifting characters of the encoded identification code based at least in part on internal data that is not publicly accessible to generate output and unseeding the internal data from the output via a logical operator to generate the decoded identification code.

9. The system of claim 8, wherein the internal data is associated with the asset.

10. The system of claim 9, wherein the internal data comprises one or more of a weight of the asset, an address associated with the asset, and a tracking identifier associated with the asset.

11. The system of claim 8, wherein the internal data comprises internal business knowledge that is not publicly accessible.

12. The system of claim 11, wherein the internal data is not associated with the asset.

13. The system of claim 8, wherein the RFID tag is affixed to the asset.

14. The system of claim 8, wherein the de-anonymization operation comprises a cryptographic operation.

15. A system comprising:
   at least one computer processor; and
   one or more computer storage media storing computer-useable instructions that, when used by the at least one computer processor, cause the at least one computer processor to perform operations comprising:
      reading a first identification code from a tag affixed to an asset;
      transforming the first identification code into a second identification code by performing a cryptographic operation on the first identification code, wherein the cryptographic operation comprises seeding the first identification code with internal data that is not publicly accessible via a logical operator to generate output and shifting characters of the output based at least in part on the internal data to generate the second identification code.

16. The system of claim 15, wherein the second identification code is associated with an identity of a shipper of the asset.

17. The system of claim 15, wherein the tag is a radio-frequency identification (RFID) tag.

18. The system of claim 17, wherein reading the first identification code comprises accessing electronic product code (EPC) memory of the RFID tag.

19. The system of claim 15, wherein the first identification code is less than or equal to 96 bits in size.

20. The system of claim 15, wherein the internal data comprises one or more of a weight of the asset, an address associated with the asset, and a tracking identifier associated with the asset.

* * * * *